3,238,678
TRAILER ANCHOR
Merritt W. Barnett, Goreville, Ill.
Filed Apr. 29, 1963, Ser. No. 276,291
1 Claim. (Cl. 52—155)

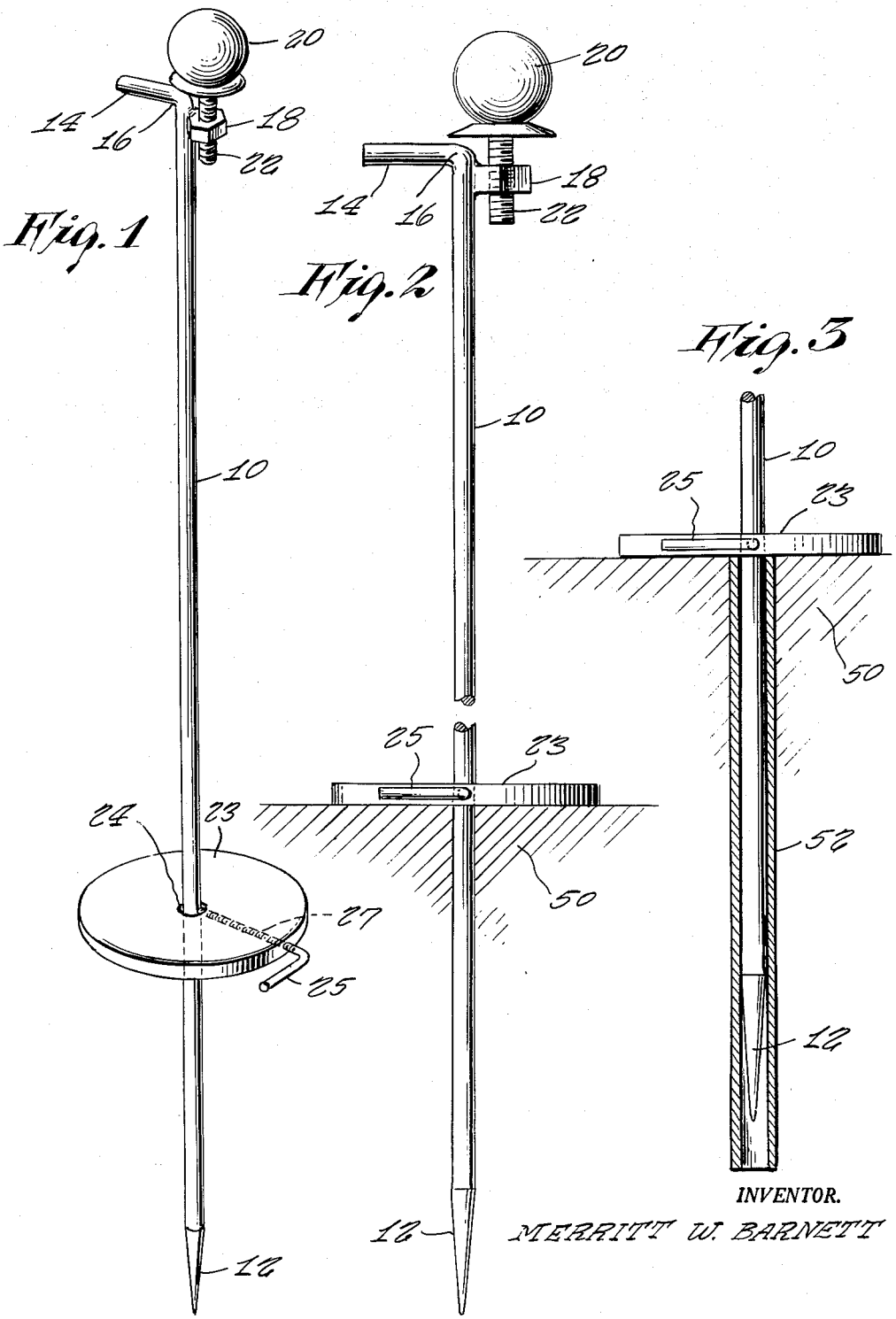

My invention is directed toward trailer anchors for anchoring boat and camp trailers either for permanent or temporary installations.

Accordingly, it is an object of my invention to provide a new and improved trailer anchor of the character indicated.

Another object is to provide a new and improved trailer anchor of the character indicated which is light in weight, can be taken anywhere and can be used as a standard accessory.

Still another object is to provide a new and improved trailer anchor of the character indicated which can be easily manufactured at low cost.

All of the foregoing and still further objects and advantages of my invention will now be explained with reference both to this specification and to the drawings wherein:

FIGURE 1 is a perspective view of my invention;
FIGURE 2 shows my invention in side view as used in a temporary installation; and
FIGURE 3 shows my invention in side view as used in a permanent installation.

Referring now to the FIGURES 1-3, a vertical metal member 10 has its bottom end 12 pointed and has a short horizontal metal element 14 secured to the top end 16. A horizontal hex nut 18 is welded to member 10 adjacent the top end 16. A standard ball coupler 20 carries a bottom vertical screw 22 welded thereto. Screw 22 is threadedly inserted into nut 18. Coupler 20 engages a suitable coupling unit on an automobile or boat in conventional manner.

A horizontal metal disc 23 has a central hole 24 through which member 10 extends. The distance from the top end 16 to disc 23 is adjusted by suitably loosening then tightening an L shaped screw 25 extending through a threaded bore 27 extending radially from the periphery of disc 22 into hole 24.

As shown in FIGURE 2, my device is temporarily installed by forcing the pointed end 12 into the ground 50 until the bottom of disc 23 contacts the top surface of the ground. As shown in FIGURE 3, a permanent installation is made by first forcing a hollow pipe 52 into the ground, and then forcing end 12 into the hollow of the pipe.

While my invention has been described with particular reference to the drawings, my protection is to be limited only by the terms of the claim which follows.

I claim:

A trailer anchor comprising a vertical member having a bottom end pointed, a horizontal element secured at one end to the top end of said member and extending generally normal thereto, a disc having a substantially central hole, said member extending through said hole, means adjustably connecting said disc along the length of said vertical member, a horizontal nut secured to said member adjacent said one end and extending in a direction other than the direction of said horizontal element, and a ball coupler having a vertical screw extending from the bottom thereof and threadedly inserted into said nut to releasably engage a coupling unit on a trailer.

References Cited by the Examiner

UNITED STATES PATENTS

| | | | |
|---|---|---|---|
| 373,240 | 11/1887 | Logan | 52—154 |
| 401,302 | 4/1889 | Purdy | 248—156 X |
| 1,402,561 | 1/1922 | Banks | 52—154 |
| 1,515,078 | 11/1924 | Shee | 248—156 X |
| 2,981,230 | 4/1961 | Putnam | 119—121 X |

FOREIGN PATENTS

| | | |
|---|---|---|
| 1,325,003 | 3/1963 | France. |
| 877,902 | 9/1961 | Great Britain. |

RICHARD W. COOKE, JR., *Primary Examiner.*

FRANK L. ABBOTT, *Examiner.*

R. S. VERMUT, *Assistant Examiner.*